Patented Sept. 4, 1945

2,384,126

UNITED STATES PATENT OFFICE 2,384,126

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application April 9, 1942, Serial No. 438,306

8 Claims. (Cl. 260—78)

This invention relates to a new group of unsaturated esters and their polymers which have very valuable properties as herein described. The esters are complex compounds in which a simple polyhydroxy compound is esterified with one acid group of each of two or more molecules of carbonic acid, the other acid group of each carbonic acid molecule being esterified with an ester of a simple monohydroxy acid and an unsaturated alcohol. The new compounds have the general structure:

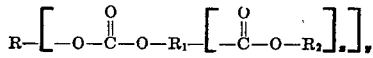

in which R is the organic radical derived from the simple polyhydroxy compound, having at least $y$ hydroxy groups, $R_1$ is the organic radical derived from the simply hydroxy acid and linking one hydroxy group and at least $x$ carboxyl groups and $R_2$ is the radical derived from the unsaturated alcohol, and where $x$ is a small whole number and $y$ is a small whole number greater than one.

In view of the complexity of the compounds herein contemplated and the ambiguous nature of certain terms used herein, it is desirable to define the intended meaning of these terms.

By "ester linkage" we mean a linking oxygen atom derived by interaction of a hydroxy group and an inorganic acid or carboxylic acid group. Thus, a carbonate R—O—CO—O—R contains two ester linkages.

By "simple polyhydroxy compound" we mean any organic compound having two or more hydroxyl groups which are not separated by an ester linkage. Thus, bis(hydroxyethyl) carbonate is not a "simple polyhydroxy compound." Suitable simple polyhydroxy compounds are the glycols such as ethylene glycol, propylene glycol, trimethylene glycol, tetramethylene glycol, 1,3-dihydroxy butane, the dihydroxy pentanes, ricinoleyl alcohol, etc.; the polyglycols such as di-, tri-, and tetraethylene glycol, di-, tri-, and tetrapropylene glycol, di-, tri-, and tetrabutylene glycol, etc.; the homocyclic polyhydroxy compounds such as resorcinol, pyrogallol, catechol, etc., or the higher polyhydroxy aliphatic compounds such as glycerol, erythritol, pentaerythritol, dextrose, sucrose, etc.

By "simple monohydroxy acid" we mean a compound which contains a single hydroxy group and at least one carboxyl group. We do not, however, intend to include compounds which have an ester linkage within the molecule, such as lactyl lactic acid

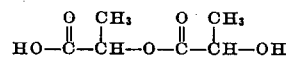

or castor oil or glycol mono or dilactate.

Suitable simple hydroxy acids are glycolic, lactic, ethylene lactic, alpha-hydroxy butyric, beta-hydroxybutyric, salicylic, phloretic, melilotic, coumaric, vanillic, leucinic, valerolactinic, acetonic, ricinoleic, tartronic, malic, itamalic, oxalacetic, isomalic, citric, and the various hydroxy phthalic acids.

The new compounds are preferably the esters of unsaturated alcohols having up to five carbon atoms and an unsaturated linkage in an aliphatic chain such as vinyl, allyl, methallyl, chlorallyl, crotyl, tiglyl, chlorocrotyl, ethylallyl, propargyl, and angelyl alcohols, methyl vinyl carbinol, ethyl vinyl carbinol, divinyl carbinol, dimethyl vinyl carbinol, etc. Esters of alcohols having six to ten carbon atoms are also useful such as geranyl, cinnamyl, phenyl-propargyl, and beta-propyl-allyl alcohols, ethyl divinyl carbinol, etc.

The new esters may be prepared by reacting a polychloroformate or polyhaloformate of a polyhydroxy compound such as ethylene glycol dichloroformate, diethylene glycol bis chloroformate, triethylene glycol bis chloroformate, propylene glycol bis chloroformate, glycerol tris chloroformate, etc., with the unsaturated alcohol esters of the monohydroxy acids such as allyl lactate, divinyl tartronate, methallyl salicylate, etc. This reaction may be conducted at low temperatures, preferably between 0° C. and 10° C. by adding the chloroformate to a mixture of the unsaturated ester and an alkaline reagent such as pyridine or other tertiary cyclic amine, or a carbonate, oxide, or hydroxide of an alkali or alkaline earth metal. When an alkaline agent of low solubility such as calcium carbonate is used, it is frequently necessary to use elevated temperatures, for example, 50–80° C., in order to induce a satisfactory rate of reaction. When strongly alkaline reagents such as sodium hydroxide are used, it may be necessary to reverse the preferred method of combining the reagents and add the alkali to a mixture of the ester of the hydroxy acid and the chloroformate to prevent a large excess of strong alkali from existing in contact with the ester being synthesized.

The same new esters may alternatively be prepared by treating the unsaturated alcohol ester of the simple hydroxy carboxylic acid, such as chloroallyl leucinate, vinyl glycolate, triallyl citrate, etc., with phosgene to form the corresponding chloroformate. This reaction is preferably conducted at subnormal temperatures (0° C. to 20° C.) and may be conducted in the presence of a diluent such as benzene, ether, carbon tetrachloride, petroleum ether, etc. The chloroformates are subsequently treated with a half molar quantity of simple polyhydroxy compound per mole of the resulting chloroformate in the presence of an alkaline reagent such as pyridine, etc., or other of the alkalies above mentioned, to form the new esters.

The new unsaturated carbonates are generally non-resinous compounds having distinct boiling and melting points and are often capable of isolation in substantially pure state. Frequently, the impurities are side reaction products which are colorless and transparent esters having characteristics similar to the esters herein contemplated. In such cases, removal of said impurities may be unnecessary unless they produce a detrimental effect in the use to which the ester is put. The new compounds are usually liquids at room temperature but some, however, are solids. The new unsaturated compounds are usually miscible with solvents such as benzene, toluene, chloroform, diethyl ether, carbon tetrachloride and petroleum ether. The monomeric esters are valuable as plasticizers for various resin materials such as styrene, cellulose, vinyl, urea, protein, phenolic, or acrylic resins. Other uses such as solvents, insecticides, and liquid coating compositions are noteworthy.

These esters may be polymerized in the presence of heat, light, or catalysts such as oxygen, ozone, or organic peroxides such as lauroyl, benzoyl, or acetone peroxides, to yield solid or liquid compositions of widely differing physical properties. The polymerized products vary in properties depending upon the structure of the ester and upon the degree of polymerization.

These polyunsaturated esters are capable of polymerization to a fusible intermediate stage and finally to a substantially infusible and insoluble polymer. The ultimate polymers of these new compounds are generally highly resistant to acids, alkalies, water, and organic solvents. The polymers thus obtained are usually colorless and transparent, although in some instances they may be slightly yellow when polymerized completely. Many of these polymers are tougher and more resistant to shattering than are the unsaturated alcohol diesters of simple polybasic acids.

Upon the initial polymerization of the polyunsaturated esters in the liquid monomeric state or in a solution of the monomer in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing a substantial portion of a polymer which is insoluble in the monomer and organic solvents and containing as well, a substantial portion of a soluble material which may be monomer and/or fusible soluble polymer. These gels are soft and bend readily. However, they are fragile and crumble or tear under low stresses. They may be further polymerized in the presence of catalysts to the final infusible insoluble state in which substantially all of the polymer is infusible and insoluble in organic solvents, acids, and alkalies.

The monomers of the polyunsaturated esters may be cast polymerized directly to the substantially insoluble, infusible state. This procedure is subject to certain inherent difficulties due to the strains which are established during polymerization of the gel and which frequently result in fractures as the final hard form is attained. It has been discovered that these difficulties may be avoided by releasing the strains established in the gel before the fracturing can occur. This may be done by permitting the strains to be relieved before the polymerization is complete, either periodically or by conducting the polymerization under conditions which permit gradual release of these strains. For example, the polymerization may be conducted in a simple mold until a soft firm gel has formed. At this point the polymer may be freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. This temperature is dependent upon the catalyst used. For benzoyl peroxide, temperatures of 65 to 80° C. are suitable, while for acetone peroxide temperatures of 140-150° C. may be used. In accordance with one modification, the gel after it is freed from the mold may be coated on both sides with monomer or the syrupy polymer. The coated article is then polymerized between smooth heated plates to the final insoluble state.

Other intermediate polymers of a more advanced state of polymerization may be prepared by continuing the heating of a soft gel which contains residual peroxide. These may be hard at normal room temperatures and may contain appreciable quantities of both the acetone soluble and acetone insoluble polymers. These advanced polymers become more flexible at higher temperatures and may be shaped after heating. Preferably, the shaping does not exceed the elastic limit of the material. The flexible sheet is held in its flexed position in a mold or other shaping device until cooled to the normal room temperature. A permanently shaped resin is thereby formed which may contain simple or complex curvatures.

Cast polymers may also be prepared by a single step polymerization directly to the insoluble infusible state. The monomer may be mixed with one to five percent of benzoyl or other organic peroxide and heated at 50–60° C. until it becomes partly polymerized and thickened to an increased viscosity of 100 to 1000 percent of the monomer viscosity. The thickened monomer may then be polymerized between glass, metal, or similar plates which are separated by compressible gaskets or retainers of Koroseal (plasticized polyvinyl chloride), butadiene polymers, polyvinyl alcohol, Thiokol (polyethylene sulfide), rubber, or similar materials arranged about the edge of such plates. The thickened monomer may be poured on one glass plate within the confines of the flexible retainer, laid about 2 inches from the edge of the plate. The second glass plate then may be carefully laid on top, taking care to avoid the trapping of air bubbles under the top plate. When the top plate is in position, both plates may be held together by means of suitable clamps which are capable of applying pressure upon the plates directly over the flexible retainer. The entire assembly is then placed in an oven and heated at 70 to 100° C. where the polymerization is continued. During the polymerization the resin shrinks and tends to draw away from the glass surfaces. To prevent fractures sufficient pressure is maintained upon the plates to depress the flexible container and minimize or prevent lateral or longitudinal shrinkage while the resin is polymerized within the mold. This pressure may be maintained by periodically tightening the clamps or by use of spring clamps which maintains a uniform pressure throughout the polymerization process.

By an alternative procedure for cast polymerizing sheets, the molds may be assembled before the thickened monomer is poured. Thus, the flexible compressible retainer may be inserted between the plates and held in place by suitable clamps located around the edge of the plates. This retainer or gasket is placed adjacent to the edge of the plates and a suitable opening may be provided between the ends of the flexible retainer, preferably at one corner of the mold. The assembled mold is then placed in a vertical position with the open corner uppermost. The thickened monomer containing up to five percent residual peroxide is then poured in slowly until the entire mold is filled. After standing until all of the entrapped air has separated the mold is sealed and heated uniformly between 70 and 100° C. to continue the polymerization. Pressure is maintained upon the plates to prevent lateral or longitudinal shrinkage of the resin during polymerization by suitable means such as by tightening the clamps periodically or by maintaining a uniform pressure upon the plates throughout the means of spring clamps. When the resin has been completely polymerized it is separated from the glass plates and a hard, transparent, colorless and durable resin sheet is obtained.

Other methods have been developed for polymerization of the compounds herein contemplated while avoiding formation of cracks and fractures. By one of these methods, the polymerization may be suspended while the monomer-polymer mixture is in the liquid state and before the polymer is converted to a gel by cooling, by removal from exposure to ultraviolet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. The fusible polymer is thus obtained in stable solid form and as such may be used as a molding powder or may be redissolved in suitable solvent for use in liquid form. It is soluble in organic solvents such as benzene, chloroform, ethyl acetate, acetone, toluene, etc. Preferably, the polymers of the new esters are produced by heating the monomer or a solution thereof in the presence of substantial quantities, for example, up to 5 percent of benzoyl peroxide until the viscosity of the solution has increased about 100 to 500 percent. This may require several hours while heating at 65 to 85° C. in the presence of benzoyl peroxide. The resulting viscous solution is poured into an equal volume of water, methyl or ethyl alcohols, glycol, or other nonsolvent for the fusible polymer. A polymer usually in the form of a powder or a gummy precipitate is thus formed which may be decanted or filtered and then dried. This permits substantially complete separation of a soluble fusible polymer from unpolymerized monomer.

Often, however, a complete separation of monomer and polymer is not desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, such a composition may contain soluble fusible polymer and from about 5 percent to 50 or 60 percent of monomer. Preferably, the production of these materials is conducted by treatment of a solution of the monomer in a solvent for monomer and intermediate polymer such as benzene, xylene, toluene, carbon tetrachloride, acetone, chloroform, ethyl acetate, etc.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be treated as above described to separate the fusible polymer from the solvent. These polymers may be used as molding or coating compositions.

Other fusible polymers may be prepared by carrying the initial polymerization to the point where the polymer is in the form of a gel which generally contains at least 20 percent and preferably about 45 to 90 percent by weight of substantially insoluble polymer, but at which point the gel is still fusible. This solid resin composition may be disintegrated to a pulverulent form and used as a molding powder. Alternatively, then, a desirable polymer may be prepared by emulsifying the monomer or a syrupy polymer in an aqueous medium with or without a suitable emulsification agent such as polyvinyl alcohols, polyallyl alcohols, etc., and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of benzoyl peroxide, generally in a heated mold. The polymers may be mixed with fillers such as alpha cellulose, wood pulp, and other fibrous substances, mineral fillers, or pigments such as zinc oxide, calcium carbonate, lead chromate, magnesium carbonate, calcium silicate, etc.; plasticizers such as the saturated alcohol esters of phthalic acid, camphor, the saturated alcohol esters of maleic, fumaric, succinic, and adipic acids or di- or triethylene glycol bis(butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The soluble fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl cellosolve, dichloroethyl ether, dibutyl phthalate, or mixtures thereof, is useful as a liquid coating composition. Objects of paper, metal, cloth, wood, leather, or synthetic resins may be coated with the solution of polymer in solvent and subsequently polymerized to yield attractively finished coatings. Similarly, porous objects of felt, cloth, leather, paper, etc., either in single layers or laminated, may be impregnated with the dissolved fusible polymer and subjected to the polymerization to the final insoluble infusible state. Other molding powders may be prepared from the new esters without first converting them to the intermediate polymer. The monomer may be mixed directly with a suitable filler such as magnesium carbonate, cellulose pulp, asbestos, etc., in a ball mill or other mixing device. By proper selection of proportions a dry pulverulent powder can be obtained which is capable of polymerization under the influence of heat and pressure to a glossy solid polymer of high tensile strength. The use of too much filler may cause a non-glossy finish and the use of too much monomer may make the powder moist and difficult to handle. Sometimes it may be desirable to precure the molding powder by subjecting it to a moderate temperature, 50 to 70° C., for a limited period of time, for example, one to three hours. This precuring operation is a partial polymerization and permits a dry molding powder where the same proportions of monomer might result in a moist molding composition.

Further details of the synthesis of these new esters and of their applications will be apparent from the following examples.

*Example I*

A mixture of 191 grams of salicylic acid, 200 grams of allyl alcohol, 200 cc. of benzene and 5 grams of p-toluenesulphonic acid monohydrate was placed in a two-liter flask and refluxed for 52 hours. The flask was equipped with a separatory condenser which removed the water and returned the benzene to the system. The benzene solution of allyl salicylate was washed with 2 percent NaOH, hydrochloric acid until neutral, and finally with water. After drying over an- hydrous sodium sulphate, it was distilled at 105–108° C. (3.5 to 4 mm.).

One mole (178 grams) of allyl salicylate was reacted with one-half mole (82 grams) of ethylene glycol bis chloroformate. The reaction was conducted by adding the chloroformate slowly to a solution of the allyl salicylate in 100 grams pyridine and 500 cc. benzene. The reaction temperature was maintained between +5 and +15° C. by means of an ice bath. The resulting mixture was washed with N/10 hydrochloric acid until neutral and with water. The benzene was removed by heating at reduced pressures (8–10 mm.). The ester was a colorless, high boiling liquid, which was believed to have the structure:

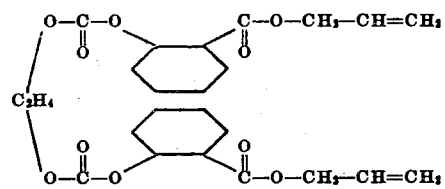

A ten gram sample was heated at 80° C. for one hour in the presence of 0.4 gram of benzoyl peroxide. A hard, transparent polymer was produced.

*Example II*

A mixture of 140 grams of salicylic acid was esterified by heating with an excess of methallyl alcohol (100 grams) for 28 hours. The reaction was conducted in the presence of 200 cc. benzene. The condensate was freed of water by gravity separation and the benzene returned to the reaction vessel. The products were washed with dilute sodium hydroxide, with N/10 hydrochloric acid, with water, and finally dried over sodium sulphate. The methallyl salicylate was separated from the benzene by distillation at reduced pressures.

In a separate reaction vessel 50 grams of dipropylene glycol was cooled to 0° C. and phosgene was bubbled through at a rate of 10 millimoles per minute while the heat of reaction was dissipated by means of an ice bath. When the glycol was saturated with phosphene the mixture was warmed to 40° C. to evolve the excess phosgene. The dipropylene glycol dichloroformate was mixed with 250 cc. benzene and the methallyl salicylate and cooled to 0° C. on an ice bath. An excess of NaOH solution (50 percent) was then added to the mixture at the rate of 2 to 3 cc. per minute. The reaction mixture was stirred vigorously. The temperature remained at all times between +2 and +13° C. After the combination of the reactants the stirring was continued for one hour. The benzene solution was washed with dilute hydrochloric acid and with water. It was dried over anhydrous sodium sulphate. The benzene was removed by topping at 40–50 mm. total pressure. The ester is a high boiling liquid believed to possess the following structure:

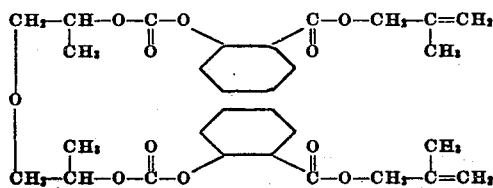

Example III

Approximately one mole of allyl salicylate (181.5 gms.) prepared by esterification of salicylic acid with allyl alcohol was mixed with 500 cc. of benzene and saturated with phosgene at temperatures between −2 and +5° C. maintained by a salt-ice freezing mixture. The phosgene was added at a rate sufficiently slow to permit the maintenance of the reaction temperatures. The mixture was stirred during the reaction and for one-half hour after the addition of reactants was completed. The excess phosgene was evolved by heating to 40° C. for one hour. The benzene solution was added slowly to a cooled mixture of 55 grams of diethylene glycol and 50 cc. of pyridine. The addition was made at the rate of 10 to 12 cc. per minute which enabled the temperature to remain below 15° C., and the reaction mixture was vigorously agitated throughout the reaction.

When the reaction was complete the benzene solution was washed with dilute hydrochloric acid and with water. After drying over anhydrous calcium chloride the benzene was distilled off at 35 to 40 mm., leaving a colorless high boiling liquid having the molecular structure:

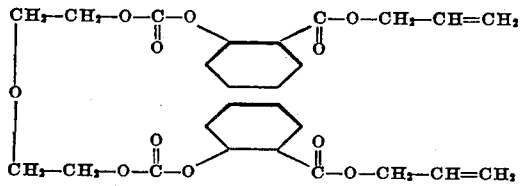

A 50 gram sample was suspended in 200 cc. of benzene and mixed with 2 grams of acetyl peroxide. After heating four hours at 60° C., the viscosity had increased about 350 percent. The viscous solution was then poured into 1000 cc. of ethyl alcohol and a gummy mass was precipitated. The soft gum was decanted, washed with water, and dried. A ten gram sample of the polymer was mixed with 0.3 gram of benzoyl peroxide and pressed in a heated (135° C.) mold under a pressure of 1800 pounds per square inch. After one hour the mold was opened and a hard, tough, transparent polymer was found.

Example IV 130 grams of allyl lactate was mixed with 100 grams pyridine and cooled to +2° C. A half-molar quantity (132 grams) of ethylene glycol dichloroformate was added slowly at the rate of 2 grams per minute for thirty minutes while stirring continuously. The rate of addition was increased to 3 grams per minute for the next fifteen minutes. The balance was added at the rate of four to five grams per minute. After completing the addition the mass was stirred for 30 minutes. The resulting ester was washed with dilute HCl solution and with water, dried over calcium chloride, and finally heated at 2-3 mm. total pressure to remove impurities. This is a colorless liquid believed to have the molecular structure:

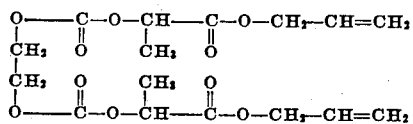

A ten gram sample of the ester was heated with 0.5 grams of acetone peroxide for 1.5 hours at 125° C. A solid transparent polymer was produced.

Example V

Equal molar parts of methallyl alcohol (300.6 grams) and glycolic acid (281 grams) were heated for 18 hours on an oil bath at the reflux temperature. The water was separated from the condensate before returning the latter to the system. The methallyl glycolate was washed with water and distilled in vacuum. The purified methallyl glycolate was cooled to 0° C. on a salt-ice cooling mixture and treated with phosgene at a rate which permitted the reaction temperature to remain below +8° C. When the reaction was complete the mixture was heated to remove any excess phosgene.

Approximately 200 grams of the chloroformate of methallyl glycolate were reacted with 75 grams of propylene glycol. The reaction was conducted in the presence of 100 grams of pyridine and 500 cc. benzene and at a temperature of 0 to 12° C. maintained by stirring the mixture vigorously while the flask was immersed in a freezing mixture. The chloroformate was added slowly to the propylene glycol at a rate which permitted the dissipation of the heat of reaction. The benzene solution was washed with diluted hydrochloric acid and water. The mixture was decolorized by heating for one hour with one gram of activated charcoal while driving off the benzene. The pressure was reduced to 2 to 3 mm. and heated to remove benzene and the excess of reactants. A colorless liquid remained which was proved to have the structure:

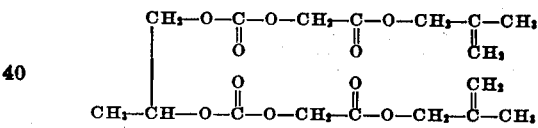

A 50 gram sample of the ester containing 3 percent benzoyl peroxide was dissolved in 300 cc. of benzene and heated until the viscosity had increased about 500 percent. The viscous solution was then poured into 500 cc. of methyl alcohol. After standing over night, a precipitated gel polymer was separated by decanting. After washing with water and drying the polymer was a white granular material.

A 10 gram sample was mixed with 3 percent benzoyl peroxide and pressed at 1500 pounds per square inch and at 135° C. A colorless transparent solid resin was produced.

Example VI

A large excess (210 grams) of crotyl alcohol, 105 grams of alpha hydroxy butyric acid and 2 grams p-toluenesulphonic acid were esterified by heating for 30 hours at reflux temperature. The water evolved was slowly removed by distillation during the reaction. The crotyl α-hydroxy butyrate was freed of impurities by distillation.

Thirty grams of trimethylene glycol was cooled to +1° C. and treated with an excess of phosgene at a rate which permitted the maintenance of the reaction temperature between +2 and +9° C. The reaction mass after completion of the reaction was heated to 45° C. to evolve the excess phosgene. The bis chloroformate was washed with two 50 cc. portions of cold water and dried over sodium sulphate. It was then distilled at 5-10 mm. total pressure. The purified bis chloroformate was mixed with 500 cc. benzene and 100 grams of the crotyl α-hydroxy butyrate. Seventy-five cubic centimeters of a prepared 50 percent solution of NaOH was slowly added with continuous stirring and the reaction flask submerged in an ice bath. The reaction temperature did not rise above 11° C. The benzene solution was washed with dilute hydrochloric acid until neutral to phenolphthalein and with water. After drying over calcium chloride the benzene was removed by topping at 35-40 mm. pressure. The ester was believed to have the following structure:

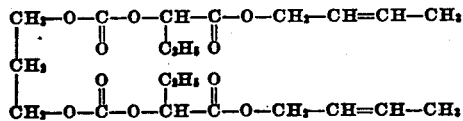

Example VII

Allyl lactate was prepared by heating a mixture of 739 cc. of 85 percent lactic acid, 2041 cc. of allyl alcohol, 9 grams of p-toluenesulphonic acid and 1000 cc. of carbon tetrachloride on an oil bath for 24.5 hours at reflux temperatures. The condensate was divided into the two liquid phase fractions and the nonaqueous phase was returned to the reaction flask. The allyl lactate was distilled at 96° C. (30 mm.). 120 grams of diethylene glycol dichloroformate was cooled to +5° C. and added slowly (3 to 4 grams per minute) to a mixture of 100 grams of allyl lactate and 85 grams of pyridine. The reaction flask was equipped with a mechanical stirring device and was surrounded by a bath of a salt-ice freezing mixture. During the reaction the temperature within the flask did not rise above 16° C. When the reaction was completed the ester was washed with dilute hydrochloric acid and with water until neutral. It was a clear liquid believed to have the structure:

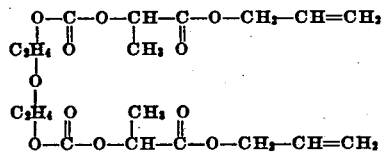

A ten gram sample was mixed with 0.3 gram of lauroyl peroxide and heated at 75° C. for two hours. A hard, light-colored polymer was produced.

Example VIII

Methallyl lactate was prepared by the method described in Example VII, except that methallyl alcohol was used in place of allyl alcohol and without use of p-toluenesulphonic acid. One-hundred and fifty grams of methallyl lactate was mixed with 500 cc. benzene and treated by bubbling gaseous phosgene through it while maintaining a temperature within the reaction vessel of +3 to +8° C. by means of an ice bath. An intimate mixture of reactants was secured by mechanical agitation. The phosgene was added at a rate slow enough to obtain the desired reaction temperature. The chloroformate was washed with water and distilled. The purified chloroformate of methallyl lactate was cooled to +5° C. and added at the rate of 2 to 3 grams per minute to a mixture of 100 grams of triethylene glycol, 600 cc. of benzene, and 90 grams of pyridine. The reaction mixture was agitated to insure the contact of reactants. During the reaction the temperature remained between +5° C. and +17° C., due to the presence of an ice bath. The benzene solution was washed with N/10 hydrochloric acid and then with water until neutral. The solution was dried over anhydrous sodium sulphate. The benzene solution was distilled and the new esters were recovered as a water-white substantially pure liquid. The ester was believed to have the following structure:

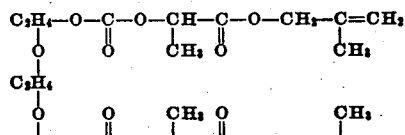

Example IX

A mixture of 200 grams of chloroallyl alcohol, 160 grams of glycolic acid, 2 grams of phenolsulphonic acid, and 500 cc. benzene was heated for 30 hours on an oil bath. The water evolved in the reaction was evaporated and condensed with the benzene. The condensate was separated into two liquid phases and the benzene phase was returned to the reaction vessel. When the reaction was complete the benzene solution was washed with Na₂CO₃ solution, with hydrochloric acid, and with water. The ester was separated from the benzene by distillation at reduced pressures. The purified ester (100 grams) was mixed with 97 grams of dipropylene glycol and 500 cc. benzene and cooled to +2° C. 70 cc. of 50% NaOH was added dropwise at a rate which enabled the maintenance of the reaction temperature below +12° C. The reaction mass was stirred vigorously and provided with an ice bath for cooling. The benzene solution was washed with water, with hydrochloric acid, and finally again with water until neutral. The solution was dried over sodium sulfate. The ester was separated from benzene and other impurities by distillation at reduced temperatures. The following formula is believed to represent the molecular structure of the new ester:

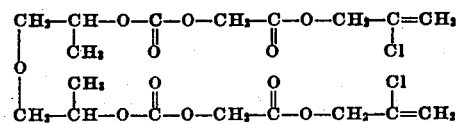

Fifty grams of the new ester was dissolved in 200 cc. of benzene and heated for 3 hours at 60° C. in the presence of 5 grams of benzoyl peroxide. The solution which had increased greatly in its viscosity was then poured into 1000 cc. of methyl alcohol and permitted to stand for six hours. A light colored precipitate was formed which was separated by decantation. After washing with water it was reprecipitated from acetone with 2 percent benzoyl peroxide. Five grams of the solid polymer was heated at 135° C. under pressure of 2000 pounds per square inch. A hard, transparent product was formed.

Example X

Allyl ricinoleate was prepared by heating 301 grams of ricinoleic acid, 59.2 grams of allyl alcohol, 2 grams of phenol sulphonic acid and 1000 cc. of carbon tetrachloride, at reflux temperature for 42 hours. The evolved water was separated from the condensate by a continuous method. The carbon tetrachloride solution was washed with one percent NaOH, with dilute hydrochloric acid until neutral to phenolphthalein and finally with water. The allyl ricinoleate was recovered from the solution by topping under reduced pressures (8–10 mm.).

Ethylene glycol dichloroformate (52 grams) was added slowly to a mixture of the allyl ricinoleate (189.4 grams), 1000 cc. benzene, and pyridine (75 grams). The reaction temperature was maintained between +5 and +11° C. by means of an ice bath. The mixture was stirred continuously. When the reaction was complete the mixture was stirred for an additional hour. The benzene solution was washed with N/10 hydrochloric acid and with water. The benzene and more volatile impurities were removed by heating in a partial vacuum. The resulting material was a clear colorless liquid ester having the following structure:

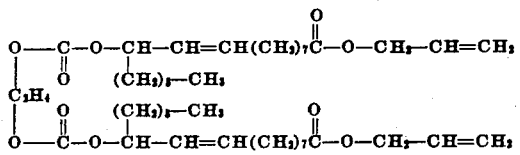

A ten gram sample was heated at 65° C. for 2 hours in the presence of 3 percent lauroyl peroxide. A hard polymer was produced.

*Example XI*

Methallyl ricinoleate was prepared by the method described in Example X except that methallyl alcohol was substituted for allyl alcohol and that the esterification was conducted without a catalyst. 1000 grams of methallyl ricinoleate was dissolved in 3000 cc. of benzene and treated with phosgene at temperatures between 0° C. and 20° C. Cooling was provided to dissipate the heat of reaction. A stirring device was used to avoid local overheating. After 300 grams of phosgene was added the mixture was stirred for an additional hour. The benzene solution of the chloroformate was washed with water and dried over anhydrous sodium sulfate. By heating under 40–50 mm. pressure the benzene was evaporated, leaving a colorless liquid chloroformate.

A mixture of 85 grams of glycerine and 250 grams of pyridine was prepared and cooled to +2° C. The chloroformate of methallyl ricinoleate was added slowly at a rate which enabled the temperature to remain below 15° C. The resulting ester was washed with dilute HCl to remove the excess pyridine and with water until neutral to phenolphthalein. The new ester was believed to have the structure:

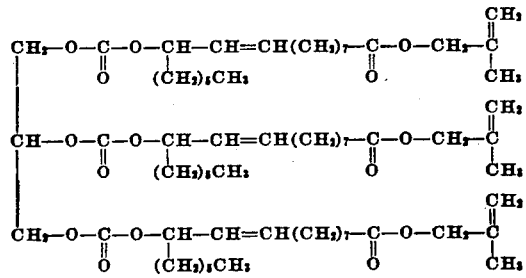

*Example XII*

Propargyl ricinoleate was prepared by direct esterification of propargyl alcohol (79 grams) and 450 grams of ricinoleic acid. The reactants were mixed with 2 grams of p-toluenesulphonic acid to catalyze the esterification. The mixture was heated on an oil bath at reflux temperatures in the presence of polymerization inhibitor. The propargyl ricinoleate thus prepared was washed with dilute NaOH and with hydrochloric acid. The ester was dried with calcium chloride. One liter of benzene was added and the solution cooled to +2° C. while stirring continuously and with the reaction vessel submerged in a mixture of salt and ice, a stream of gaseous phosgene was bubbled through the benzene solution at the rate of 20 to 50 millimeters per minute. The actual rate was regulated so as to keep the temperature of reaction below +12° C. After one hour the reaction was complete and the mixture was permitted to warm to room temperature overnight. The chloroformate was washed with 500 cc. of water, and dried with anhydrous sodium sulphate. A mixture of 100 grams of diethylene glycol and 85 grams of pyridine was cooled to +10° C. While maintaining the reaction mass below 20° C. the chloroformate was added slowly. An ice bath surrounded the reaction flask and provided the necessary cooling. When the reaction was completed the benzene solution was washed with N/10 hydrochloric acid and with water and dried over Na₂SO₄. The ester was separated from the benzene by evaporation. The following formula was believed to represent the molecular structure of the new ester:

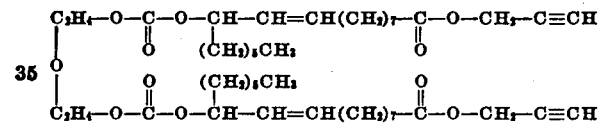

Although the present invention has been described with respect to certain specific examples, it is not intended that the details thereof shall be limitations upon the scope of the invention except as incorporated in the following claims.

This case is a continuation-in-part of Serial No. 361,280, filed October 15, 1940, and Serial No. 403,703, filed July 23, 1941, by Irving E. Muskat and Franklin Strain.

We claim:

1. A diester of (a) ethylene glycol and (b) a partial ester of carbonic acid and allyl ricinoleate.
2. A triester of (a) glycerol and (b) a partial ester of carbonic acid and methallyl ricinoleate.
3. A diester of (a) diethylene glycol and (b) a partial ester of carbonic acid and propargyl ricinoleate.
4. A polymer of a diester of (a) ethylene glycol and (b) a partial ester of carbonic acid and allyl ricinoleate.
5. A polymer of a triester of (a) glycerol and (b) a partial ester of carbonic acid and methallyl ricinoleate.
6. A polymer of a diester of (a) diethylene glycol and (b) a partial ester of carbonic acid and propargyl ricinoleate.
7. A compound having the structural formula:

wherein R is a radical of the group consisting of hydrocarbon radicals having a valence equal to $y$ and radicals represented by the formula ($—R_3—[O—R_3]_n—$) in which $R_3$ is an alkylene radical and $n$ is a small whole number, $R_1$ is a hydrocarbon radical having a valence equal to $(x+1)$, $R_2$ is a radical equivalent to the radical $R_2$ in the alcohol $R_2OH$, said alcohol being an unsaturated monohydric alcohol having from 2 to 10 carbon atoms and having an unsaturated carbon-to-carbon linkage adjacent the beta carbon atom therein, $x$ is a small whole number less than 4, and $y$ is a small whole number greater than 1.

8. A polymer of the compound defined by claim 7.

IRVING E. MUSKAT.
FRANKLIN STRAIN.